(12) United States Patent
Rowell et al.

(10) Patent No.: US 10,326,541 B2
(45) Date of Patent: Jun. 18, 2019

(54) TEST ARRANGEMENT AND TEST METHOD

(71) Applicant: Rohde & Schwarz GmbH & Co. KG, München (DE)

(72) Inventors: Corbett Rowell, München (DE); Hendrik Bartko, Unerhaching (DE); Adam Tankielun, Ottobrunn (DE); Vincent Abadie, Hohenschäftlarn (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 3 days.

(21) Appl. No.: 15/726,677

(22) Filed: Oct. 6, 2017

(65) Prior Publication Data

US 2019/0109654 A1    Apr. 11, 2019

(51) Int. Cl.
*H04B 17/15*    (2015.01)
*H04B 17/29*    (2015.01)

(52) U.S. Cl.
CPC ............. *H04B 17/15* (2015.01); *H04B 17/29* (2015.01)

(58) Field of Classification Search
CPC .................................. H04B 17/15; H04B 17/29
See application file for complete search history.

(56) References Cited

U.S. PATENT DOCUMENTS

| 5,229,776 A * | 7/1993 | Kelly | H01Q 3/267 |
| | | | 342/173 |
| 7,119,739 B1 * | 10/2006 | Struckman | G01R 29/10 |
| | | | 342/174 |
| 7,876,276 B1 * | 1/2011 | Zaman | H01Q 3/08 |
| | | | 343/703 |

OTHER PUBLICATIONS

Schmidt, C.H., Laitinen, T.A. and Eibert, T.F., 2011. Hybrid Fast Fourier Transform—plane wave based near-field far-field transformation for "body of revolution" antenna measurement grids. Radio Science, 46(5).*
Doren W. Hess, Far-Field to Near-Field Transforms in Spherical Coordinates, V.14 (SP.6*), W.-M. Boerner et al. (eds.), Inverse Methods in Electromagnetic Imaging, Part 2, 1255-1266. © 1985 by D. Reidel Publishing Company.*

* cited by examiner

*Primary Examiner* — Zhitong Chen
(74) *Attorney, Agent, or Firm* — Westman, Champlin & Koehler, P.A.

(57) ABSTRACT

A test arrangement for wirelessly testing a device under test comprises a number of test antennas that are placed in the near-field of the device under test for receiving wireless signals from the device under test and/or transmitting wireless signals to the device under test, a channel modifier coupled to the test antennas for weighting the signals received by the test antennas and/or the signals transmitted by the test antennas according to predetermined weighting parameters, and a near-field to far-field transformer that is coupled to the channel modifier and transforms the weighted signals received by the test antennas into far-field signals.

18 Claims, 5 Drawing Sheets

TEST ARRANGEMENT AND TEST METHOD

TECHNICAL FIELD

The present invention relates to a test arrangement. The present invention further relates to a test method.

BACKGROUND

Although applicable in principal to any wireless test system, the present invention and its underlying problem will be hereinafter described in combination with testing of wireless devices.

The use of wireless communication systems for communication between electronic device increases continually with the advance of high-speed wireless data communications.

During development or production of devices for such communication systems it is necessary to thoroughly test the devices for compliance with communication standards and legal regulations, especially regarding wireless communication standards and legal regulations.

Usually the respective wireless communication standards and legal regulations will determine the circumstances under which a test must be performed.

For example, usually the compliance tests of such devices require far-field measurements of the respective devices. However, far-field measurements usually require large measurement chambers with sizes of up to 100s of meters or complex and costly arrangements, like e.g. Compact Antenna Test Ranges or CATRs.

In addition, especially during development of such devices it may be required or beneficial to perform channel characteristics simulations on the measured signals. This allows accounting for different channel characteristics that may be present under real operating conditions and analyzing the respective behavior of the device that is developed.

Against this background, the problem addressed by the present invention is to provide a simple test equipment for wireless devices.

SUMMARY

The present invention solves this object by a test arrangement with the features of claim 1, and by a test method with the features of claim 14.

Accordingly it is provided:

A test arrangement for wirelessly testing a device under test, the test arrangement comprising a number of test antennas that are placed in the near-field of the device under test for receiving wireless signals from the device under test and/or transmitting wireless signals to the device under test, a channel modifier coupled to the test antennas for weighting the signals received by the test antennas and/or the signals transmitted by the test antennas according to predetermined weighting parameters, and a near-field to far-field transformer that is coupled to the channel modifier and transforms the weighted signals received by the test antennas into far-field signals.

Further, it is provided:

A test method for wirelessly testing a device under test, the test method comprising receiving wireless signals from the device under test and/or transmitting wireless signals to the device under test with a number of test antennas that are placed in the near-field of the device under test, weighting the signals received by the test antennas and/or the signals transmitted by the test antennas according to predetermined weighting parameters with a channel modifier coupled to the test antennas, and transforming the weighted signals received by the test antennas from near-field to far-field signals with a near-field to far-field transformer that is coupled to the channel modifier.

As explained above, usually measurements on devices under test are performed in the near-field, while the data is required for the far-field. Any type of channel emulation may be performed in the far field, e.g. by modifying the measurement values for the respective points in the far-field region. However, modifying single points in the far-field may be inefficient.

The present invention therefore provides the test system that is capable of performing a channel simulation in the near-field and then providing respective far-field measurement values.

Since a single modification of a value in the near field may influence all values in the far-field, the present invention allows easily performing very complex channel fading simulations with little effort.

It is understood, that the test antennas may e.g. be provided as single antenna elements. However, the test antennas may also be provided as an antenna array. Further, the test antennas may be movable around the device under test or the device under test may be provided on a rotatable and/or movable support structure.

Further embodiments of the present invention are subject of the further subclaims and of the following description, referring to the drawings.

In a possible embodiment, the channel modifier may comprise a phase modulator and/or an amplitude modulator for every one of the test antennas.

The test arrangement may comprise from a single test antenna to a plurality of test antennas. It is understood, that the test antennas may be stationary or movable in relation to the device under test. In this case either the test antennas may be movable or the device under test may be movable, e.g. rotatable.

If more than one test antenna is provided, every antenna may be provided with a dedicated phase modulator. In addition or as alternative, every antenna may also be provided with an amplitude modulator.

The predetermined weighting parameters may be provided individually for every one of the phase modulators and/or every one of the amplitude modulators.

In a possible embodiment, the channel modifier may weigh the signals received by the test antennas and/or the signals transmitted by the test antennas by at least one of adding the weighting parameters to, subtracting the weighting parameters from, dividing by the weighting parameters, multiplying with the weighting parameters or convolving with the weighting parameters the signals received by the test antennas and/or the signals transmitted by the test antennas.

The mathematical operation that is performed for weighting the signals received by the test antennas and/or the signals transmitted by the test antennas may be selected according to a respective application. This allows flexibly adapting the test arrangement to the respective measurement task or the type of channel simulation that is required e.g. for a respective measurement or qualification.

In a possible embodiment, the predetermined weighting parameters may comprise a phase modifier and/or an amplitude modifier.

The phase modifier may e.g. comprise an absolute phase value (positive or negative) that is added to the phase of the signal received by the respective test antenna. As an alternative, the phase modifier may comprise a relative phase value that is applied to the phase of the signals received by the respective test antenna. The same may apply to the amplitude modifier that may either comprise an absolute amplitude value (positive or negative) that is added to the amplitude of the signal received by the respective test antenna, or a relative amplitude value that is applied to the phase of the signal received by the respective test antenna.

It is further understood, that the phase modifiers and the amplitude modifiers may be individually provided for every test antenna, e.g. depending on the position of the respective test antenna.

It is further understood, that the phase modifiers and the amplitude modifiers may also be provided as location dependent variables. For example with test arrangements that allow moving the test antennas, the phase modifiers and the amplitude modifiers may be provided individually for different locations around the device under test.

In addition, the phase modifiers and the amplitude modifiers may also be provided as time dependent variables that change over time.

In a possible embodiment, the test arrangement may comprise a parameter determination logic that is coupled to the channel modifier and determines the predetermined weighting parameters based on channel characteristics of a predetermined radio frequency channel.

The channel parameters may e.g. be determined by measuring, simulating or manually defining fading parameters as a function of or using as a basis a respective planar wave component in the far-field region over a predetermined surface, e.g. a spherical surface, a conical surface or a planar surface.

In a possible embodiment, the weighting parameters may comprise spatially transformed channel parameters.

As already indicated above, the channel parameters may e.g. be determined based on a respective planar wave component in the far-field region over a predetermined surface, e.g. a spherical surface, a conical surface or a planar surface.

By performing the respective spatial transformation, the spatially transformed channel parameters may easily be generated based on the fading parameters.

In a possible embodiment, the parameter determination logic may perform an inverse Fourier Transform, especially an inverse spatial Fourier Transform, of far-field channel parameters of the predetermined radio frequency channel to determine the predetermined weighting parameters.

The above referenced spatial transformation may be performed in the form of an inverse (Fast) Fourier Transform. It is understood, that in any case a Fourier Transform is mentioned in this document, a Fast Fourier Transform may also be applied. The same applies to inverse Fourier Transforms.

In a possible embodiment, the near-field to far-field transformer may perform a Fourier Transformation, especially a spatial Fast Fourier Transform, to transform the weighted signals received by the test antennas into far-field signals.

Performing a Fourier Transform or a spatial Fourier Transform is a very simple and effective way of performing the near-field to far-field transformation.

In a possible embodiment, the near-field to far-field transformer may comprise a dedicated transformation hardware, or executable instructions that when executed by a processor perform a near-field to far-field transformation, or a combination of both.

The transformation hardware may e.g. comprise a FPGA or the like that comprises a hardware section that is configured to perform the processing that is required for the near-field to far-field transformation. Such an FPGA may e.g. comprise input data interfaces for receiving the near-field signals and output data interfaces for outputting the transformed far-field signals.

In case the near-field to far-field transformer is provided as executable instructions, these executable instructions may e.g. be provided in a memory that is coupled to a processor that executes the instructions. It is understood, that such a processor may also comprise input data interfaces for receiving the near-field signals and output data interfaces for outputting the transformed far-field signals.

Further, the near-field to far-field transformer may also be provided as a combination of hardware and software. For example, a management function may be implemented as executable instructions in the memory, while the transformation is performed in hardware, e.g. on the FPGA. The management function may e.g. perform the tasks of receiving the incoming data, providing the incoming data to the hardware transformer, receiving the transformed data from the hardware transformer and outputting the transformed data.

In a possible embodiment, the test arrangement may comprise a signal measurement device that is arranged between the channel modifier and the near-field to far-field transformer or that is coupled to an output of the near-field to far-field transformer.

The signal measurement device may be any device that is capable of measuring and e.g. digitizing the signals received via the test antennas. Such a signal measurement device may e.g. be an oscilloscope or the like.

This means that the channel modifier will perform the respective weighting before the received wireless signals are processed by the signal measurement device in any case. The near-field to far-field transformation may however be performed prior to measuring the signals with the signal measurement device or after measuring the signals with the signal measurement device. This allows making use of high quality and high speed analog-to-digital converters that are usually provided in such signal measurement devices, like e.g. oscilloscopes. In addition, the near-field to far-field transformation may also be performed with processing means of the signal measurement device.

In a possible embodiment, the test arrangement may comprise a far-field to near-field transformer that is coupled to the channel modifier and is configured to transform input far-field signals into near-field signals for modification by the channel modifier and emission by the test antennas.

With the far-field to near-field transformer it is possible to generate near-field signals that are to be sent to the device under test based on input far-field signals. Such input far-field signals may e.g. be determined by measurements of an existing RF channel, simulations or the like.

It is therefore possible to analyze the behavior of the device under test in receiving direction based on the input far-field signals.

It is however understood, that input near-field signals may also be provided. If input near-field signals are provided there is no need to perform the far-field to near-field transformation and such signals may directly be provided to the channel modifier.

In a possible embodiment, the far-field to near-field transformer may perform an inverse Fourier Transformation, especially an inverse spatial Fast Fourier Transform, to transform the input far-field signals into near-field signals for modification by the channel modifier and emission by the test antennas.

Performing an inverse Fourier Transform or an inverse spatial Fourier Transform is a very simple and effective way of performing the far-field to near-field transformation.

In a possible embodiment, the test arrangement may comprise a signal generation device that is coupled to an input of the far-field to near-field transformer or the channel modifier and generates the input far-field signals.

The signal generation device may e.g. comprise a signal generator, especially a vector signal generator or the like.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
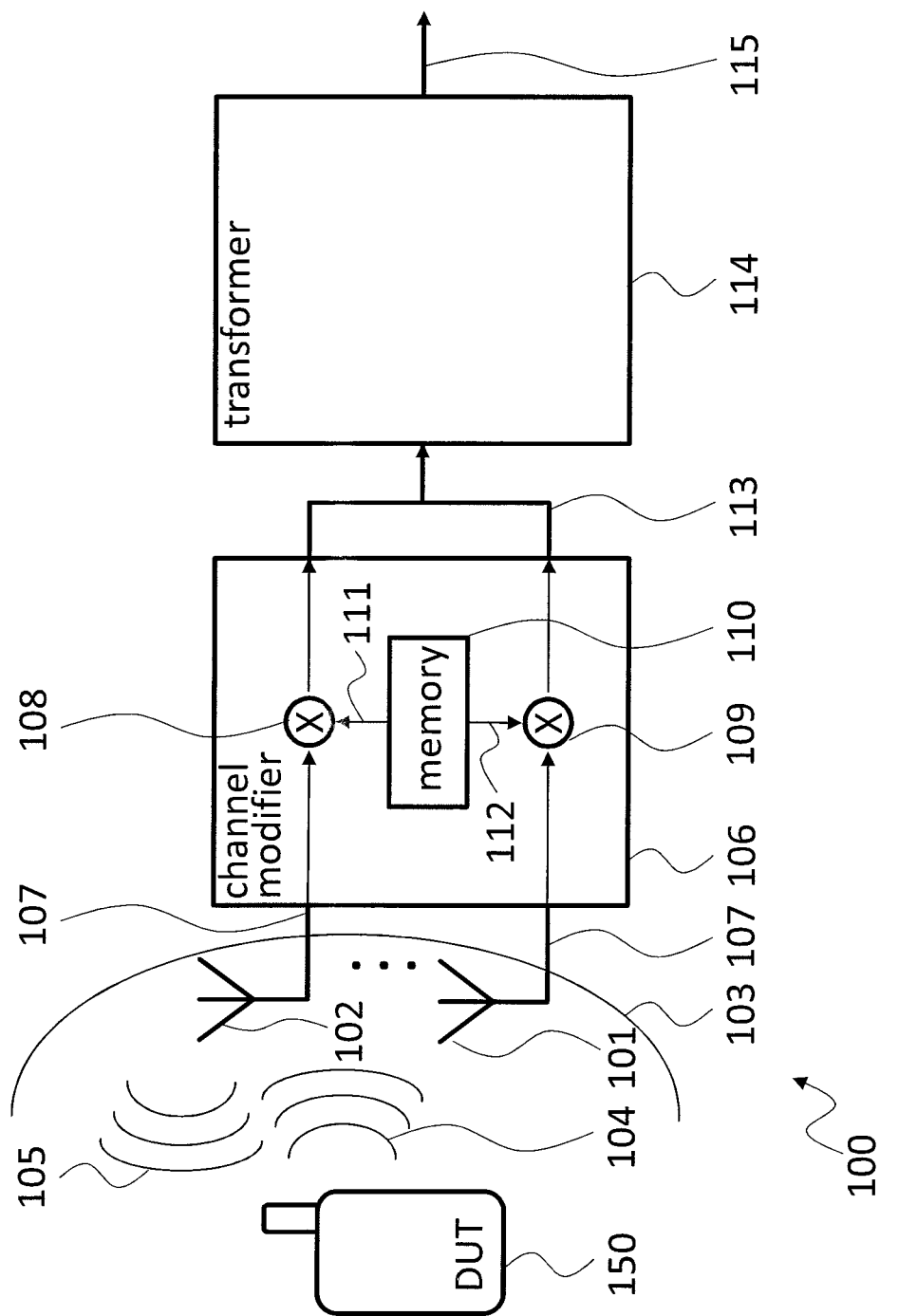
FIG. 1 shows a block diagram of an embodiment of a test arrangement according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DETAILED DESCRIPTION OF THE DRAWINGS

FIG. 1 shows a block diagram of an embodiment of a test arrangement 100 for wirelessly testing a device under test 150. The test arrangement 100 comprises two exemplary test antennas 101, 102 that are placed in the near-field 103 of the device under test 150. The test antennas 101, 102 are coupled to a channel modifier 106 that is coupled to a near-field to far-field transformer 114. The channel modifier 106 comprises two signal modulators 108, 109, one for each one of the test antennas 101, 102. In addition, the channel modifier 106 comprises a memory 110.

The test antennas 101, 102 receive wireless incoming signals 104 from the device under test 150 and may also transmit wireless outgoing signals 105 to the device under test 150. Although only two test antennas 101, 102 are shown, it is understood, that any number of test antennas, i.e. one or more, is possible.

In the following the processing of the wireless incoming signals 104 will be explained in detail. The processing of the wireless outgoing signals 105 will be explained in more detail with regard to FIG. 4. It is understood, that the explanations regarding the processing of the wireless incoming signals 104 may be applied mutatis mutandis to the processing of the wireless outgoing signals 105.

The wireless incoming signals 104 as received by the test antennas 101, 102 are provided to the channel modifier 106. In the channel modifier 106 the signal modulators 108, 109 weight the wireless incoming signals 104 received by the test antennas 101, 102 according to predetermined weighting parameters 111, 112 that are stored in the memory 110.

The weighted signals 113 are then provided to the near-field to far-field transformer 114 that transforms the weighted signals 113 into far-field signals 115.

The signal modulators 108, 109 may e.g. comprise at least one of a phase modulator and an amplitude modulator for every one of the test antennas 101, 102. The predetermined weighting parameters 111, 112 may therefore comprise a phase modifier value and an amplitude modifier value, respectively.

The channel modifier 106, i.e. the signal modulators 108, 109, may weigh the signals received by the test antennas 101, 102 by at least one of adding the weighting parameters 111, 112 to, subtracting the weighting parameters 111, 112 from, dividing by the weighting parameters 111, 112, multiplying with the weighting parameters 111, 112 or convolving with the weighting parameters 111, 112 the wireless incoming signals 104 received by the test antennas 101, 102.

The weighting parameters 111, 112 may comprise spatially transformed channel parameters. The weighting parameters 111, 112 may e.g. be determined by an inverse Fourier Transform, especially an inverse spatial Fourier Transform, based on far-field channel parameters of the predetermined radio frequency channel. To this end a parameter determination logic may be performed.

The channel modifier 106 may e.g. be implemented with analog or digital elements. The channel modifier 106 may for example comprise analog input interfaces that couple to the test antennas 101, 102. The analog input interfaces may e.g. comprise impedance matching circuitry, filters, amplifiers and the like. In the channel modifier 106 the signal modulators 108, 109 may be provided as a phase shifter and an amplitude modulator built up of analog electrical and/or electronic elements. The outputs of the signal modulators 108, 109 may be coupled to respective output interfaces of the channel modifier 106. With analog signal modulators 108, 109, the weighting parameters 111, 112 stored in the memory 110 may e.g. be converted into analog control signals, e.g. voltages or currents, with respective digital-to-analog converters.

The above mentioned parameter determination logic may be provided as a logic device that determines the weighting parameters 111, 112 in real time or in advance based on a definition of the RF channel. Such a parameter determination logic may e.g. be hardware based and e.g. comprise a respective FPGA or DSP. Alternatively the parameter determination logic may comprise computer executable instructions in a memory that are executed on a processor that loads the executable instructions from the memory.

The near-field to far-field transformer 114 may e.g. perform a Fourier Transformation, like e.g. a spatial Fast Fourier Transform, to transform the weighted signals 113 into far-field signals 115.

The near-field to far-field transformer 114 may comprise a dedicated transformation hardware, e.g. implemented on an FPGA or a CPLD. Alternatively the near-field to far-field transformer 114 may comprise executable instructions that when executed by a processor perform a near-field to far-field transformation. The near-field to far-field transformer 114 may also comprise a combination of hardware and software.

Figure 2:
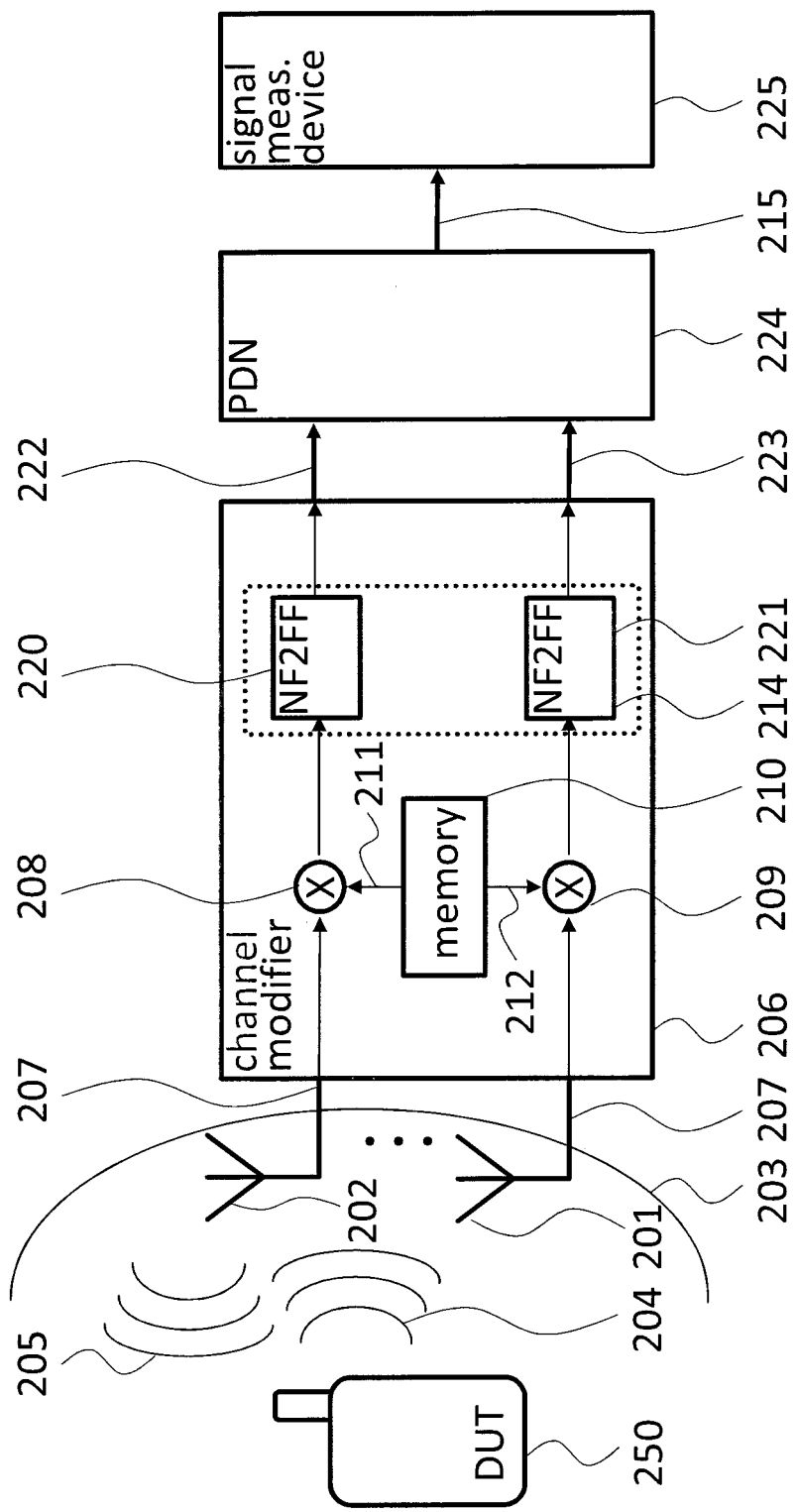
FIG. 2 shows a block diagram of another embodiment of a test arrangement according to the present invention.

FIG. 2 shows a block diagram of another embodiment of a test arrangement 200 for a device under test 250. The test arrangement 200 is based on the test arrangement 100. Therefore, the test arrangement 200 also comprises two test antennas 201, 202 that are coupled to a channel modifier 206 with signal modulators 208, 209 that are provided from a memory 210 with weighting parameters 211, 212.

In the test arrangement 200 the near-field to far-field transformer 214 is implemented in the channel modifier 206 comprising two single transformation units 220, 221, one for every one of the test antennas 201, 202. In addition, a power distribution network 224 or PDN 224 is coupled to the channel modifier 206 and a signal measurement device 225 is coupled to the power distribution network 224.

It is understood, that the near-field to far-field transformer 214 may also be provided externally to the channel modifier 206, i.e. between the channel modifier 206 and the power distribution network 224. The signal measurement device 225 may e.g. be an oscilloscope or any other type of signal measurement device 225. In this arrangement the transformation units 220, 221 may e.g. each comprise an analog-to-digital converter, a processing unit and a digital-to analog-converter, to perform the transformations that are necessary to provide the near-field to far-field transformation and provide respective transformed signals 222, 223 to the power distribution network 224.

Figure 3:
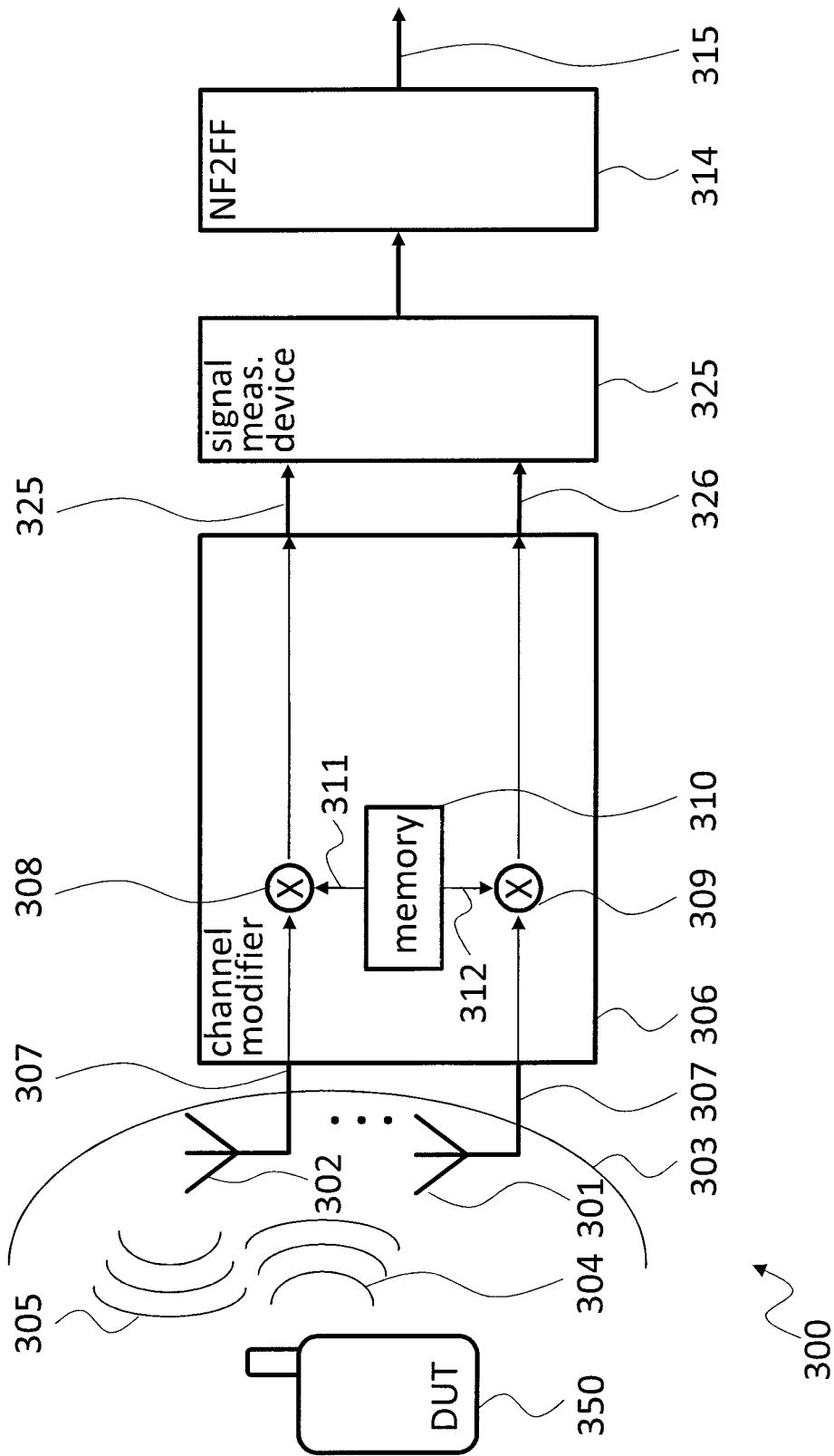
FIG. 3 shows a block diagram of another embodiment of a test arrangement according to the present invention.

FIG. 3 shows a block diagram of another embodiment of a test arrangement 300 for a device under test 350. The test arrangement 300 is based on the test arrangement 100. Therefore, the test arrangement 300 also comprises two test antennas 301, 302 that are coupled to a channel modifier 306 with signal modulators 308, 309 that are provided from a memory 310 with weighting parameters 311, 312. In contrast to the test arrangement 200, in the test arrangement 300 the near-field to far-field transformer 314 is not provided in the channel modifier 306. Instead, the near-field to far-field transformer 314 is provided as separate unit after the signal measurement device 327. The power distribution network 224 is omitted in this arrangement.

In the test arrangement 300 the weighted signals 325, 326 are first received by the signal measurement device 327. This signal measurement device 327 may e.g. be an oscilloscope with high quality and high speed analog-to-digital converters. This means that the near-field to far-field transformer 314 receives the weighted signals 325, 326 as high quality digitized signals and is not required to perform an analog-to-digital conversion.

Figure 4:
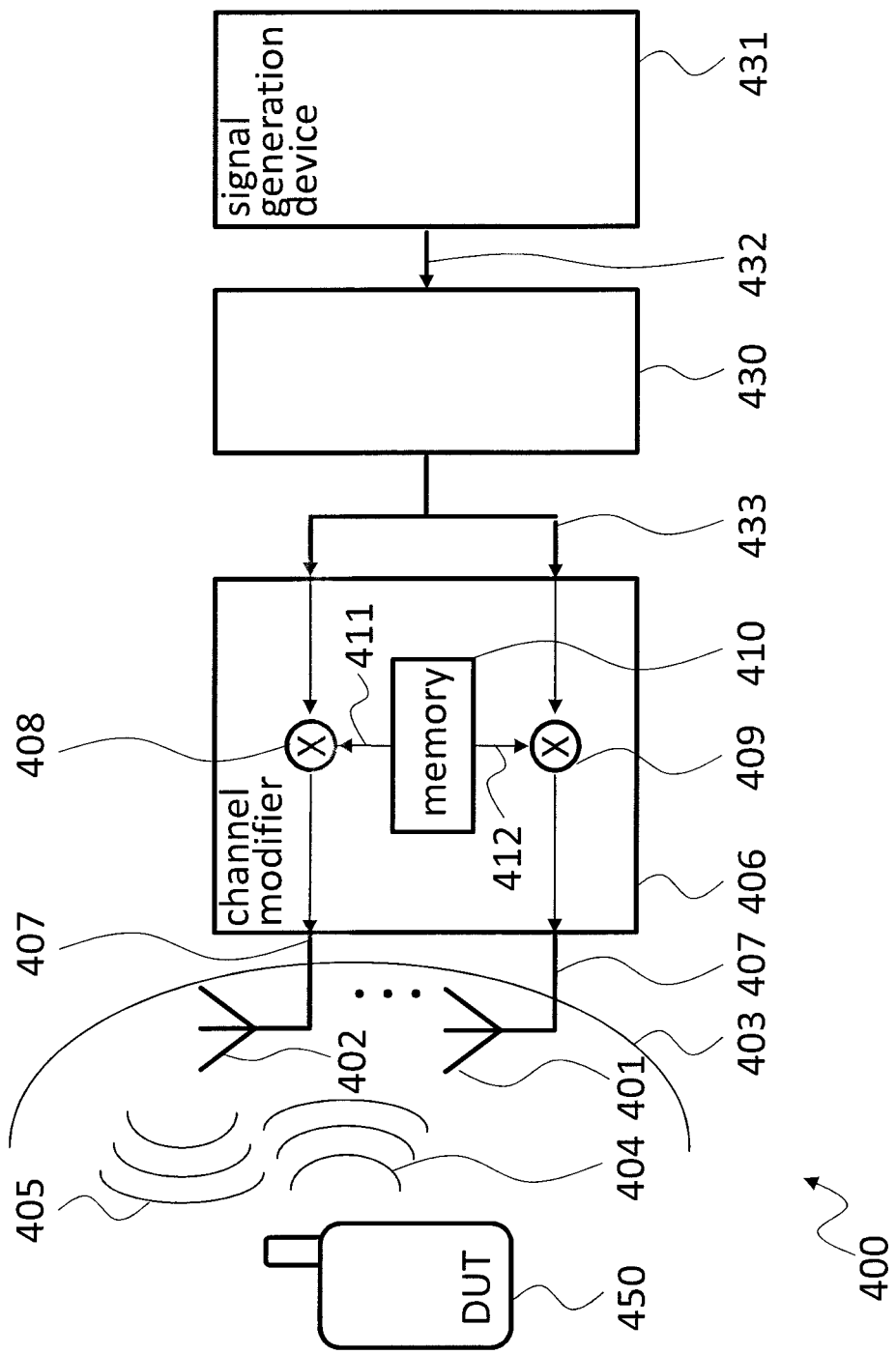
FIG. 4 shows a block diagram of another embodiment of a test arrangement according to the present invention.

FIG. 4 shows a block diagram of another embodiment of a test arrangement 400 for a device under test 450. The test arrangement 400 is based on the test arrangement 100. Therefore, the test arrangement 400 also comprises two test antennas 401, 402 that are coupled to a channel modifier 406 with signal modulators 408, 409 that are provided from a memory 410 with weighting parameters 411, 412.

The test arrangement 400 serves to show that the present invention may also be used to emit wireless outgoing signals 405 to the device under test 450. A signal generation device 431 generates input far-field signals 432 for a far-field to near-field transformer 430. The far-field to near-field transformer 430 performs an inverse Fourier Transformation, for example an inverse spatial Fast Fourier Transform, to transform the input far-field signals 432 into near-field signals 433 for modification by the channel modifier 406 and emission by the test antennas 401, 402.

For sake of clarity in the following description of the method based FIG. 5 the reference signs used above in the description of apparatus based FIGS. 1-4 will be maintained.

Figure 5:
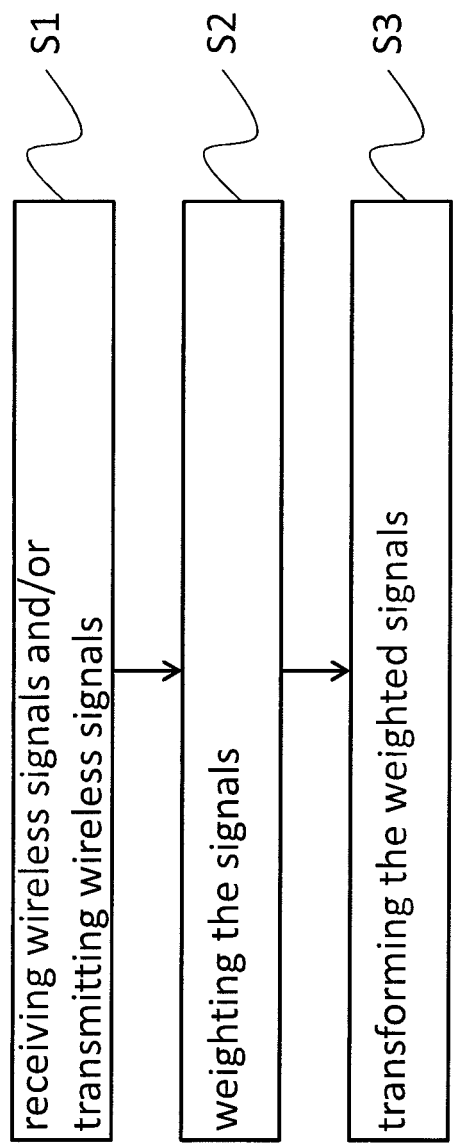
FIG. 5 shows a flow diagram of an embodiment of a test method according to the present invention.

FIG. 5 shows a flow diagram of an embodiment of a test method for wirelessly testing a device under test 150, 250, 350, 450.

The test method comprises receiving S1 wireless signals from the device under test 150, 250, 350, 450 and/or transmitting wireless signals to the device under test 150, 250, 350, 450 with a number of test antennas 101, 102, 201, 202, 301, 302, 401, 402 that are placed in the near-field 103, 203, 303, 403 of the device under test 150, 250, 350, 450, weighting S2 the signals received by the test antennas 101, 102, 201, 202, 301, 302, 401, 402 and/or the signals transmitted by the test antennas 101, 102, 201, 202, 301, 302, 401, 402 according to predetermined weighting parameters 111, 112, 211, 212, 311, 312, 411, 412 with a channel modifier 106, 206, 306, 406 coupled to the test antennas 101, 102, 201, 202, 301, 302, 401, 402, and transforming S3 the weighted signals 113, 325, 326 received by the test antennas 101, 102, 201, 202, 301, 302, 401, 402 from near-field to far-field signals 115, 215, 315 with a near-field to far-field transformer 114, 214, 314 that is coupled to the channel modifier 106, 206, 306, 406.

Weighting may comprise modulating a phase and/or an modulating an amplitude for every one of the test antennas 101, 102, 201, 202, 301, 302, 401, 402. The channel modifier 106, 206, 306, 406 may e.g. weight the signals received by the test antennas 101, 102, 201, 202, 301, 302, 401, 402 and/or the signals transmitted by the test antennas 101, 102, 201, 202, 301, 302, 401, 402 by at least one of adding the weighting parameters 111, 112, 211, 212, 311, 312, 411, 412 to, subtracting the weighting parameters 111, 112, 211, 212, 311, 312, 411, 412 from, dividing by the weighting parameters 111, 112, 211, 212, 311, 312, 411, 412, multiplying with the weighting parameters 111, 112, 211, 212, 311, 312, 411, 412 or convolving with the weighting parameters 111, 112, 211, 212, 311, 312, 411, 412 the signals received by the test antennas 101, 102, 201, 202, 301, 302, 401, 402 and/or the signals transmitted by the test antennas 101, 102, 201, 202, 301, 302, 401, 402. To this end, the predetermined weighting parameters 111, 112, 211, 212, 311, 312, 411, 412 may comprise a phase modifier and/or an amplitude modifier.

The test method may comprise determining the predetermined weighting parameters 111, 112, 211, 212, 311, 312, 411, 412 based on channel characteristics of a predetermined radio frequency channel with a parameter determination logic that is coupled to the channel modifier 106, 206, 306, 406.

The weighting parameters 111, 112, 211, 212, 311, 312, 411, 412 comprise spatially transformed channel parameters. The parameter determination logic may e.g. perform an inverse Fourier Transform, especially an inverse spatial Fourier Transform, of far-field channel parameters of the predetermined radio frequency channel to determine the predetermined weighting parameters 111, 112, 211, 212, 311, 312, 411, 412.

Transforming may comprise performing a Fourier Transformation, especially a spatial Fast Fourier Transform, to transform the weighted signals 113, 325, 326 received by the test antennas 101, 102, 201, 202, 301, 302, 401, 402 into far-field signals 115, 215, 315. Transforming may be performed with a dedicated transformation hardware, or executable instructions that when executed by a processor perform a near-field to far-field transformation, or a combination of both.

The test method may comprise measuring the signals received by the test antennas 101, 102, 201, 202, 301, 302, 401, 402 with a signal measurement device 225, 327 that is arranged between the channel modifier 106, 206, 306, 406 and the near-field to far-field transformer 114, 214, 314 or that is coupled to an output of the near-field to far-field transformer 114, 214, 314.

In addition, the test method may comprise transforming input far-field signals into near-field signals for modification by the channel modifier 106, 206, 306, 406 and emission by the test antennas 101, 102, 201, 202, 301, 302, 401, 402 with a far-field to near-field transformer 430 that is coupled to the channel modifier 106, 206, 306, 406. The far-field to near-field transformer 430 may e.g. perform an inverse Fourier Transformation, especially an inverse spatial Fast Fourier Transform, to transform the input far-field signals into near-field signals for modification by the channel modifier 106, 206, 306, 406 and emission by the test antennas 101, 102, 201, 202, 301, 302, 401, 402.

The test method may also comprise generating the input far-field signals with a signal generation device 431 that is coupled to an input of the far-field to near-field transformer 430 or the channel modifier 106, 206, 306, 406.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300, 400 test arrangement
101, 102, 201, 202 test antenna
301, 302, 401, 402 test antenna
103, 203, 303, 403 near-field
104, 204, 304, 404 wireless incoming signal
105, 205, 305, 405 wireless outgoing signal
106, 206, 306, 406 channel modifier
107, 207, 307, 407 received signal
108, 109, 208, 209 signal modulator
308, 309, 408, 409 signal modulator
110, 210, 310, 410 memory
111, 112, 211, 212 weighting parameter
311, 312, 411, 412 weighting parameter
113, 325, 326 weighted signal
114, 214, 314 near-field to far-field transformer
115, 215, 315 far-field signal
220, 221 transformation unit
222, 223 transformed far-field signal
224 power distribution network
225, 327 signal measurement device
430 far-field to near-field transformer
431 signal generation device
432 input far-field signal
433 near-field signal
150, 250, 350, 450 device under test
S1-S3 method steps

The invention claimed is:

1. A test arrangement for wirelessly testing a device under test, the test arrangement comprising:
   a number of test antennas that are placed in the near-field of the device under test for receiving wireless signals from the device under test and/or transmitting wireless signals to the device under test,
   a channel modifier coupled to the test antennas for weighting the signals received by the test antennas and/or the signals transmitted by the test antennas according to predetermined weighting parameters,
   a near-field to far-field transformer that is coupled to the channel modifier and transforms the weighted signals received by the test antennas into far-field signals,
   comprising a parameter determination logic that is coupled to the channel modifier and determines the predetermined weighting parameters based on channel characteristics of a predetermined radio frequency channel,
   wherein the weighting parameters comprise spatially transformed channel parameters,
   wherein the parameter determination logic performs an inverse spatial Fourier Transform of far-field channel parameters of the predetermined radio frequency channel to determine the predetermined weighting parameters, and
   herein the near-field to far-field transformer performs a spatial Fast Fourier Transformation, to transform the weighted signals received by the test antennas into far-field signals.

2. The test arrangement according to claim 1, wherein the channel modifier comprises a phase modulator and/or an amplitude modulator for every one of the test antennas.

3. The test arrangement according to claim 1, wherein the channel modifier weights the signals received by the test antennas and/or the signals transmitted by the test antennas by at least one of adding the weighting parameters to, subtracting the weighting parameters from, dividing by the weighting parameters, multiplying with the weighting parameters or convolving with the weighting parameters the signals received by the test antennas and/or the signals transmitted by the test antennas.

4. The test arrangement according to claim 1, wherein the predetermined weighting parameters comprise a phase modifier and/or an amplitude modifier.

5. The test arrangement according to claim 1, wherein the near-field to far-field transformer comprises a dedicated transformation hardware, or executable instructions that when executed by a processor perform a near-field to far-field transformation, or a combination of both.

6. The test arrangement according to claim 1, comprising a signal measurement device that is arranged between the channel modifier and the near-field to far-field transformer or that is coupled to an output of the near-field to far-field transformer.

7. The test arrangement according to claim 1, comprising a far-field to near-field transformer that is coupled to the channel modifier and transforms input far-field signals into near-field signals for modification by the channel modifier and emission by the test antennas.

8. The test arrangement according to claim 7, wherein the far-field to near-field transformer performs an inverse Fourier Transformation, especially an inverse spatial Fast Fourier Transform, to transform input far-field signals into near-field signals for modification by the channel modifier and emission by the test antennas.

9. The test arrangement according to claim 7, comprising a signal generation device that is coupled to an input of the far-field to near-field transformer or the channel modifier and generates the input far-field signals.

10. A test method for wirelessly testing a device under test, the test method comprising:
receiving wireless signals from the device under test and/or transmitting wireless signals to the device under test with a number of test antennas that are placed in the near-field of the device under test,
weighting the signals received by the test antennas and/or the signals transmitted by the test antennas according to predetermined weighting parameters with a channel modifier coupled to the test antennas,
transforming the weighted signals received by the test antennas from near-field to far-field signals with a near-field to far-field transformer that is coupled to the channel modifier,
comprising determining the predetermined weighting parameters based on channel characteristics of a predetermined radio frequency channel with a parameter determination logic that is coupled to the channel modifier,
wherein the weighting parameters comprise spatially transformed channel parameters,
wherein the parameter determination logic performs an inverse spatial Fourier Transform of far-field channel parameters of the predetermined radio frequency channel to determine the predetermined weighting parameters, and
wherein transforming comprises performing a spatial Fast Fourier Transformation to transform the weighted signals received by the test antennas into far-field signals.

11. The test method according to claim 10, wherein weighting comprises modulating a phase and/or modulating an amplitude for every one of the test antennas.

12. The test method according to claim 10, wherein the channel modifier weights the signals received by the test antennas and/or the signals transmitted by the test antennas by at least one of adding the weighting parameters to, subtracting the weighting parameters from, dividing by the weighting parameters, multiplying with the weighting parameters or convolving with the weighting parameters the signals received by the test antennas and/or the signals transmitted by the test antennas.

13. The test method according to claim 10, wherein the predetermined weighting parameters comprise a phase modifier and/or an amplitude modifier.

14. The test method according to claim 10, wherein transforming is performed with a dedicated transformation hardware, or executable instructions that when executed by a processor perform a near-field to far-field transformation, or a combination of both.

15. The test method according to claim 10, comprising measuring the signals received by the test antennas with a signal measurement device that is arranged between the channel modifier and the near-field to far-field transformer or that is coupled to an output of the near-field to far-field transformer.

16. The test method according to claim 10, comprising transforming input far-field signals into near-field signals for modification by the channel modifier and emission by the test antennas with a far-field to near-field transformer that is coupled to the channel modifier.

17. The test method according to claim 16, wherein the far-field to near-field transformer performs an inverse Fourier Transformation, especially an inverse spatial Fast Fourier Transform, to transform the input far-field signals into near-field signals for modification by the channel modifier and emission by the test antennas.

18. The test method according to claim 16, comprising generating the input far-field signals with a signal generation device that is coupled to an input of the far-field to near-field transformer or the channel modifier.

* * * * *